Figure 1:
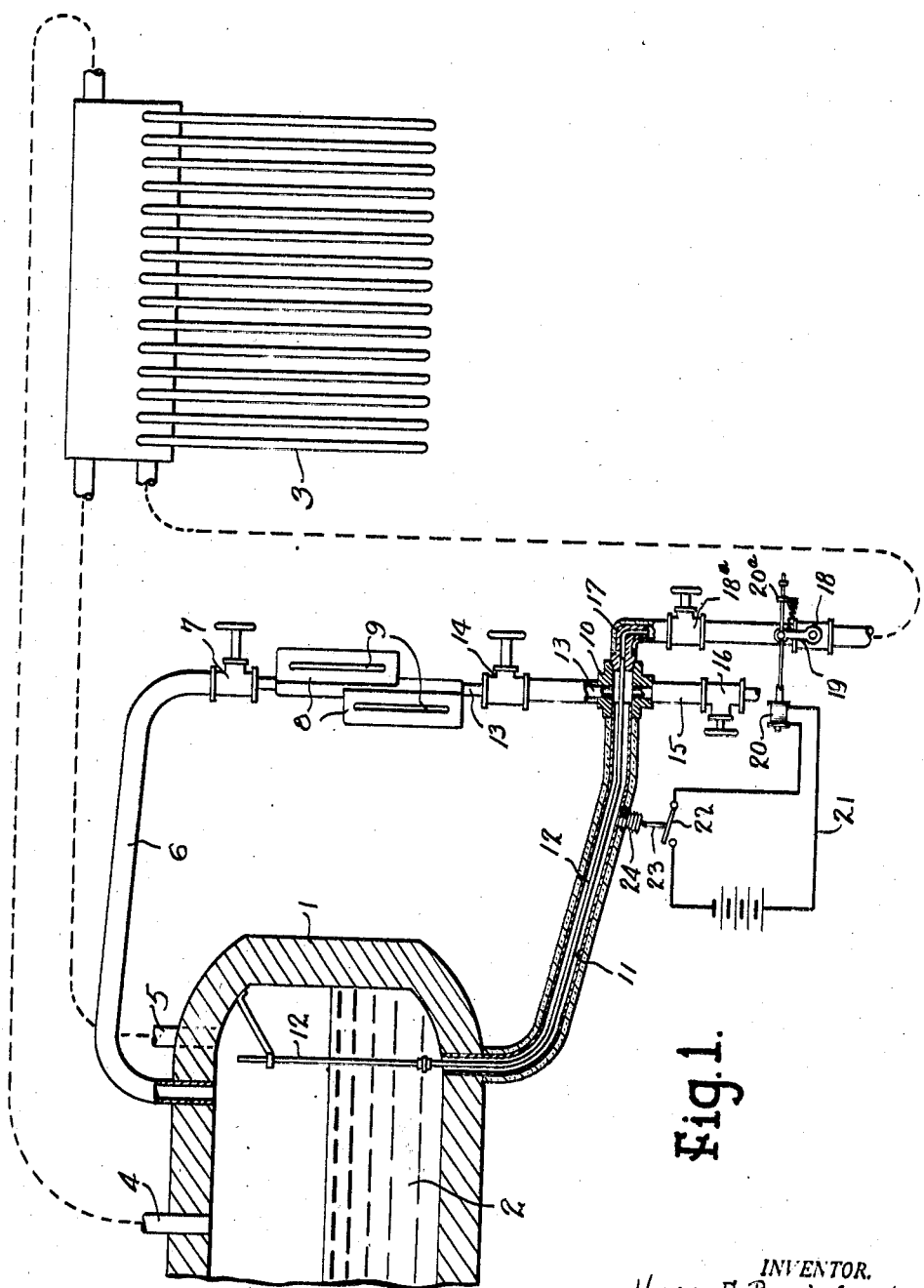

June 13, 1944. H. E. BRELSFORD 2,351,099
LIQUID LEVEL GAUGE
Filed Nov. 28, 1941

INVENTOR.
Harry E. Brelsford
BY
Attorney

Patented June 13, 1944

2,351,099

UNITED STATES PATENT OFFICE 2,351,099

LIQUID LEVEL GAUGE

Harry E. Brelsford, Birmingham, Mich., assignor to Diamond Power Specialty Corporation, Detroit, Mich., a corporation of Michigan Application November 28, 1941, Serial No. 420,760

6 Claims. (Cl. 73—328)

This invention relates to steam boilers and particularly to water level indicating devices therefor.

The principal object of the invention is to provide a device for accurate indication of the water level in boilers even though the gauge therefor may be located at a substantial distance therefrom, the device being well adapted for use with modern boilers having thick high pressure drums with which the indicator is directly associated.

It is difficult to drill the end of a drum of a high pressure boiler at the line of lowest water level for connection of a gauge because localized stresses are already necessarily present at that region and it is inadvisable and perhaps unsafe to increase them as would be done by drilling. Such practice also makes a difficult gauge connection from a manufacturing and installation standpoint. And yet it has been very desirable to have the lower gauge connection at the lowest water level because of increased range of reading.

It has been found, for instance, that where the lower gauge connection is inserted in the drum at some point along the bottom, which is mechanically more feasible than as above described, that the line to the gauge must be looped and that inaccuracy of reading results due to increased length of the line with resultant increased radiation losses. Due to slow circulation of the water through the gauge the water is cooler at the bottom of the gauge than in the boiler and it tends to act as a restriction, because of the greater specific gravity causing a back pressure which makes the gauge read too low. A difference of a few hundred degrees in temperature of opposite sides of a gauge may cause an error as high as nine inches or more at high pressure. The detrimental result is increased in installations, in any case, where it is necessary to place the gauge at a substantial distance from the boiler. At times, this distance is many feet and, very often as a matter of convenience, it would be highly desirable to increase the distance of the gauge from the boiler if accuracy of reading can be maintained.

Specifically, it is an object of this invention to provide a pipe line leading from a boiler to a gauge, or to the bottom valve thereof, with means incorporated therein and associated therewith to maintain constant the density of the water throughout the length thereof so that the gauge itself will be subject to conditions in replica of the conditions of the water within the boiler, either to an exact extent or to a known lesser extent.

Another object is to provide a gauge together with means for regulating the temperature of the water at the lower end of the gauge to a predetermined exact number of degrees below the temperature of the water within the boiler which will give a reading at all times within a known range of error so small as to be inconsequential for all practical purposes.

Other objects and advantages will become more fully apparent as reference is had to the accompanying drawing wherein my invention is illustrated, and in which, Fig. 1 shows my invention applied to a boiler installation, the boiler drum and that part of the connections therefrom pertinent to the invention being in longitudinal vertical section, the remainder of the showing being largely diagrammatic.

More particularly I indicates the drum of a steam boiler having water 2 therein which, it is assumed, is indicated in the drawing as being at its top desired maximum level. The drum I is a high pressure chamber in which steam is generated, the steam being saturated and, hence, at the approximate temperature of the boiling point of water. The drum is usually connected to a super heater 3 by way of the lines 4 and 5. The super heater is always at lower pressure than the interior of the drum I when steam is being delivered.

Leading from the top of the drum I is a top gauge connection 6 in the form of a pipe having a valve 7 along its length and connected into the top of the gauge 8. The gauge has two vision glasses 9 through which the level of the water therein may be seen. Leading from the bottom of the drum I to a union 10 below the gauge 8 is a lower gauge connection in the form of a pipe 11 having a conduit 12 extending longitudinally therethrough. The conduit has an outside diameter substantially smaller than the inside diameter of the pipe 11 and projects into the drum I substantially above the top maximum level of the water 2, being open at its top for the entry of steam.

Connected into the top of the union 10 is a pipe line 13 having a valve 14 inserted in the length thereof and connecting the interior of the union 10 with the interior of the gauge 8. The two valves 7 and 14 make it possible to disconnect the gauge 8 from the interior of the drum I in case a gauge glass is to be changed or for any other desired purpose. Since the pipe 13 is rather short the radiation therefrom will be slight and the temperature of the water conducted therethrough to the gauge 8 will be substantially the same as that in the pipe 11. Extending vertically downward from the union 10 is a drain pipe 15 having a blow-down valve 16 in the length thereof.

The conduit 12 extends into a third outlet pipe 17 from the union 10 and leads into a low pressure zone, here shown as the super heater 3, but which may be any other low pressure zone. It will be noted that this conduit never opens into the water in the pipe 11 and that heat imparted to the water in the pipe 11 must be through the walls of the conduit. If the flow of steam through the conduit 12 is very rapid the water in the pipe 11 may possibly be converted into steam whereas if steam does not flow fast enough to maintain the water substantially at saturation temperature the desired result will not be fully accomplished. I, therefore, insert a valve 18 in the line 17 having a valve lever 19 connected to the plunger or core of a solenoid 20. The coil of the solenoid is energized by an electric circuit 21 upon closing of a switch 22 which has a link 23 connected to a thermostatic element 24 exposed to the interior of the pipe 11. Thus, if the temperature in the pipe 11 drops slightly at the point of insertion of the thermostat 24 the link 23 will be actuated to close the switch 22 and thus to increase the flow of steam through the conduit 12, and if the temperature increases above the predetermined point the switch 22 will be opened. A stop 20a may be provided to limit the movement of the valve by the solenoid.

In the event of failure of the thermostatic valve or the circuit therefor, or as a substitute for the thermostatic valve, I provide a manual valve 18a by which the line 17 may be restricted as desired.

The particular construction of thermostatically controlled valves is no part of my invention. Thermostatically operated valves suitable for this purpose are on the market.

What is claimed is:

1. The combination of a gauge for indicating the level of water in a boiler, a connection from the top of said gauge to the steam compartment of said boiler and a connection from the bottom of said gauge to the water compartment of said boiler comprising a pipe, and means imparting heat to said pipe along the length thereof comprising a conduit extending longitudinally of said pipe and projecting into the water compartment of said boiler to a height substantially above the water level therein and open at its upper end to admit steam, a vent at the outer end of said conduit into a region of pressure lower than that in said steam compartment and valvular means near the gauge for controlling the flow of steam through said conduit.

2. The combination of a gauge for indicating the level of water in a boiler, a connection from the top of said gauge to the steam space of said boiler and a connection from the bottom of said gauge to the water space of said boiler comprising a pipe, means imparting heat to said pipe along the length thereof, comprising a conduit of substantially smaller outside diameter than the inside diameter of said pipe extending longitudinally through said pipe, said conduit projecting into said boiler above the top water level thereof and being open to admit steam, valvular means for regulating the flow of steam through said conduit, and a return line leading from said valvular means to a super heater header constituting a unit of said boiler.

3. The combination of a gauge for indicating the level of water in a boiler, a connection from the top of said gauge to said boiler and a connection from the bottom of said gauge to said boiler comprising a pipe, means imparting heat to said pipe along the length thereof, comprising a conduit of substantially smaller outside diameter than the inside diameter of said pipe extending longitudinally through said pipe, said conduit projecting into said boiler above the top water level thereof and being open to admit steam, and a thermostatically operated control valve for regulating the rate of flow of steam through said conduit, said control valve being set to limit the flow of steam through said conduit to a rate such that the water in said pipe will be maintained slightly below that necessary to form steam.

4. The combination of a boiler gauge located at a remote point from a boiler, a pipe line including said gauge in its length connected at one end into the steam compartment of the boiler and at its other end to the water compartment of said boiler, a conduit extending substantially concentrically of that portion of said pipe line leading from the water compartment of said boiler to said gauge, said conduit opening at one end into the steam compartment of said boiler and opening at its other end to a region having a pressure lower than that in said steam compartment whereby steam in said conduit maintains the temperature of the water between the boiler and said gauge.

5. The combination of a boiler gauge located at a remote point from a boiler, a pipe line including said gauge in its length connected at one end into the steam compartment of the boiler and at its other end to the water compartment of said boiler, a conduit extending longitudinally and interiorly of that portion of said pipe line leading from the water compartment of said boiler to said gauge, said conduit opening at one end into the steam compartment of said boiler and opening at its other end to a region having a pressure lower than that in said compartment, a valvular means for controlling the flow of steam through said conduit whereby the heat imparted from said steam to the water in said pipe line may be controlled.

6. The combination of a boiler gauge located at a remote point from a boiler, a pipe line including said gauge in its length connected at one end into the steam compartment of the boiler and at its other end to the water compartment of said boiler, a conduit extending longitudinally and interiorly of that portion of said pipe line leading from the water compartment of said boiler to said gauge, said conduit opening at one end into the steam compartment of said boiler and opening at its other end to a region having a pressure lower than that in said steam compartment, a valvular means for controlling the flow of steam through said conduit whereby the heat imparted from said steam to the water in said pipe line may be controlled, and thermostatic means for regulating the opening and closing of said valvular means.

HARRY E. BRELSFORD.